J. W. DEARING.
GAS SHUT-OFF VALVE.
APPLICATION FILED AUG. 20, 1914.
1,224,284.
Patented May 1, 1917.
2 SHEETS—SHEET 1.
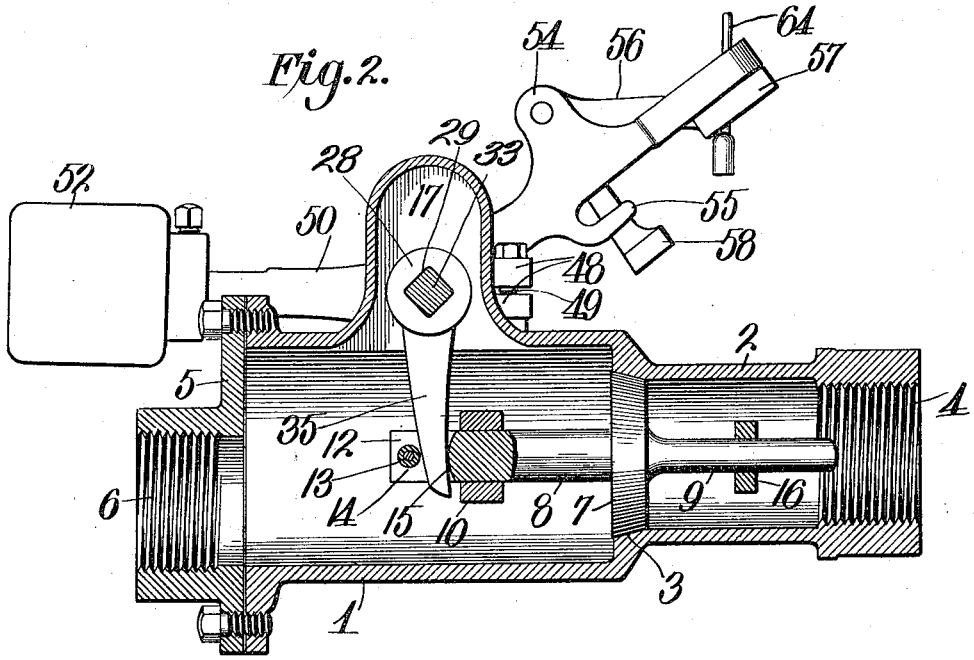
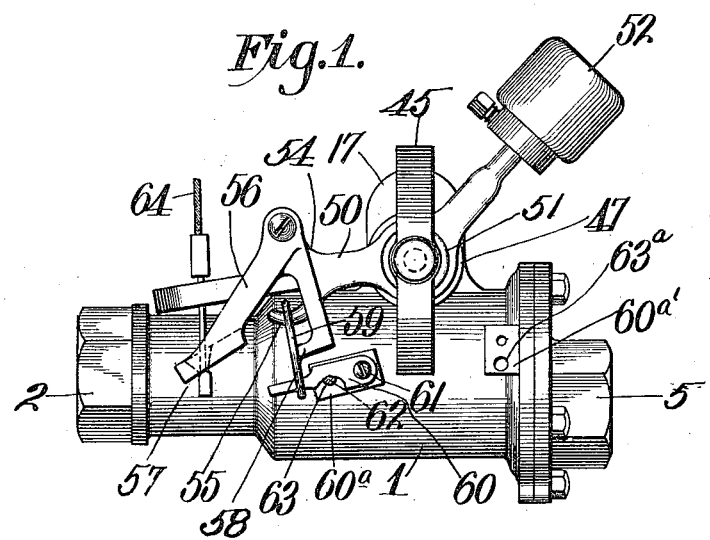
WITNESSES:
Frank R Glow
A M Thorpe
INVENTOR
J. W. Dearing
BY
George H Thorpe
ATTORNE

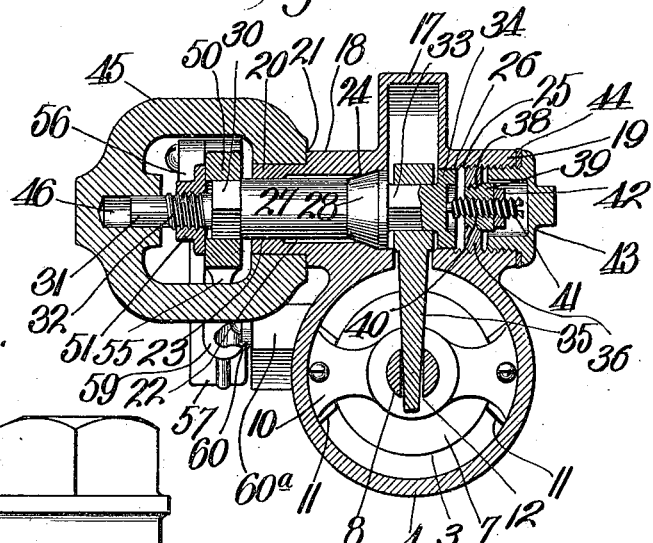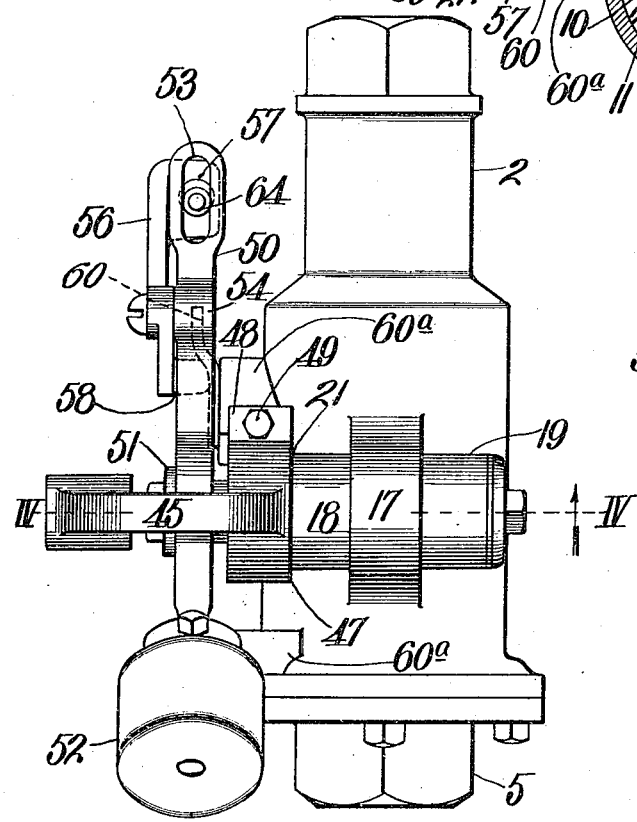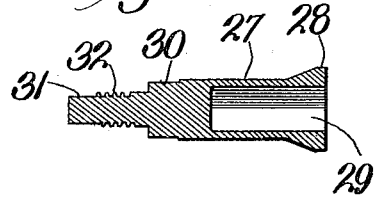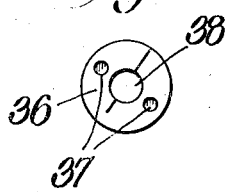

UNITED STATES PATENT OFFICE.

JOSEPH W. DEARING, OF KANSAS CITY, MISSOURI, ASSIGNOR TO EUREKA AUTOMATIC GAS VALVE MFG. CO., OF KANSAS CITY, MISSOURI, A CORPORATION OF ARIZONA.

GAS-SHUT-OFF VALVE.

1,224,284.  Specification of Letters Patent.  Patented May 1, 1917.

Application filed August 20, 1914. Serial No. 857,687.

*To all whom it may concern:*

Be it known that I, JOSEPH W. DEARING, a citizen of the United States, residing at Kansas City, in the county of Jackson and State of Missouri, have invented certain new and useful Improvements in Gas-Shut-Off Valves, of which the following is a specification.

This invention relates to gas shut-off valves for use in the gas line between the street connection and meter of a building, of that class which can be manually closed from a point exterior to the building, when necessary, and which can also be made to operate automatically if desired, and my object primarily is to produce a valve of the type outlined which contains no packing to prevent leakage of gas because a valve for emergency purposes such as this, may stand for years without being operated, and such test no known packing will withstand. My object is also to produce a valve adapted for either horizontal or vertical installation, and which is of simple, compact, strong and durable construction.

With these general objects in view, the invention consists in certain novel and peculiar features of construction and combinations of parts as hereinafter described and claimed; and in order that the invention may be fully understood reference is to be had to the accompanying drawings, in which—

Figure 1, is a side elevation of a gas shut-off valve embodying my invention, the casing and pipe line being omitted.

Fig. 2, is an enlarged central vertical longitudinal section with the valve in closed position as distinguished from Fig. 1 in which the position of the controlling parts, shows that the valve is open.

Fig. 3, is a top plan view of the valve.

Fig. 4, is a section on the line IV—IV of Fig. 3.

Fig. 5, is a central section of one member of the sectional shaft.

Fig. 6, is a face view of the split nut.

In the said drawings, 1 is a cylinder of reduced diameter at one end at 2, and provided at the point of juncture of the main and reduced portion of its bore, with a valve seat 3, the discharge end of the reduced portion of the bore being threaded at 4.

5 is a cap closing the receiving end of the cylinder and provided with a threaded opening 6. The gas line pipe (not shown) connects with the head 5, in opening 6, and with the reduced portion of the cylinder in opening 4, to conduct gas from the valve to the meter (not shown).

7 is a tapered disk valve-plug having alined stems 8 and 9 projecting from its opposite sides, stem 8 extending slidingly through a bridge 10 secured at its opposite ends to lugs 11 within the cylinder, and said stem 8 is provided with a vertical opening 12, one wall of which consists of a cross-pin 13 carrying an anti-friction roller 14. The opposite wall of the opening is rounded at 15 to reduce the friction surface thereof. The stem 9 extends slidingly through a bridge 16 within the reduced portion of the cylinder, the two bridges thus serving to insure undeviating reciprocatory movement of the valve, without interfering with the flow of the gas into the building.

In the vertical plane of the longitudinal center of the cylinder is an arched portion or dome 17, and the same is provided with alined hub portions 18 and 19. The hub portion 18 terminates in a cylindrical portion 20 of reduced diameter to form a shoulder 21. The hub 18 has an axial bore or passage 22, which, at its outer end, is of reduced diameter to form a slip-joint bearing 23, and which at its inner end, is flared to form a beveled seat or bearing 24.

The hub 19 is provided with an axial bore 25 threaded for the greater portion of its length and of slightly reduced diameter at its inner end to form a smooth bearing at 26 which is preferably of slightly greater diameter than any part of the bore of hub 18.

A sectional shaft for transmitting power to close or open the valve is constructed as follows: 27 indicates the cylindrical or body-portion of one member of the shaft, one end of the body portion terminating in a conical enlargement 28 and having an axially-extending socket 29. At its opposite end the body-portion is reduced slightly to form the angular portion 30, and to a greater extent to provide the stem 31 having threads 32. The other member of the sectional shaft consists of an angular portion 33 to fit into and bear against the bottom of socket 29, and an enlarged circular head 34. The sectional shaft is fitted in position by slipping it through hub 19 until arrested through the engagement of the conical portion 28 with the beveled seat or bearing 24, the parts being so proportioned that the cylindrical portion 27 at the same time finds a bearing on bearing 23 and enlargement 34 engages bearing 26, as shown clearly in Fig. 4.

To transmit power from the sectional shaft to the valve plug 7, a removable crank arm 35 is provided, the same fitting on angular portion 33 of the shaft and extending down through the opening 12 in valve stem 8. In practice the crank arm 35 is slipped into the cylinder and up into the arched portion or dome and then after it is engaged with the opening 12 of the valve stem, the engaging section of the sectional shaft is fitted into position so that when turned it shall impart like movement to the crank arm.

For holding the conical portion 28 of the sectional shaft with a gas tight relation on the beveled seat or bearing 24 and for hermetically sealing the hub 19 against leakage of gas, I provide the following construction: 36 is a split nut screwed into the hub 19, preferably by means of a spanner wrench, the nut therefore having spanner openings 37. To clamp this nut firmly against accidental movement it is provided centrally with a tapered threaded opening 38 wherein is screwed a tapered screw plug or wedge 39, hereinafter termed the expanding plug. The expanding plug is provided with a threaded bore 40 engaged by an adjusting screw 41, and to guard against unscrewing movement of said screw, a lock nut 42 is screwed against the said plug, on the adjusting screw, the inner end of the latter bearing upon the adjacent end of the crank-carrying member of the sectional shaft. A hollow nut protects the parts which hold the sectional shaft upon seat 24, said hollow nut being numbered 43, and clamping against the outer end of hub 19, a suitable gasket 44.

45 is a yoke provided with a socket 46, receiving the reduced cylindrical end 31 of the sectional shaft. At their inner ends, the arms of the yoke are formed with a split collar 47 to slip upon the reduced portion 20 of hub 18 until arrested by shoulder 21, and said split collar terminates in lugs 48 connected by a screw 49, whereby the yoke is clamped rigidly in place.

An angle shaped lever 50 extends through the yoke 45 and fits non-rotatably on the angular portion 30 of the sectional shaft, a nut 51 engaging the threaded portion 32 of said shaft, clamping the lever against the outer end of the cylindrical portion 27 of said shaft, and adjustably secured upon one end of said lever is a weight 52, which under the proper conditions may effect the automatic seating of valve plug 7 and the consequent shutting off of the gas. The lever is provided at its opposite end with a longitudinal slot 53, and inward thereof with an upstanding lug 54 and a depending outwardly-disposed hook 55.

Pivotally suspended from the lug of said lever is a substantially inverted V-shaped trigger 56 provided at the lower end of one arm with a laterally projecting perforated foot 57 underlying the lever and adapted under conditions hereinafter named to impart an upward blow thereon for the purpose of imparting closing movement to valve plug 7, and as this movement occurs, the other arm of the trigger is adapted—preferably through a laterally-projecting foot 58—to push or kick a link 59 off hook 55 and a plate 60 secured to one of the bosses $60^a$—$60^{a\prime}$ on cylinder 1, by means of a screw 61 and a dowel-pin 62 engaging a socket 63 or $63^a$ in the cylinder, there being two points on the cylinder for the attachment of plate 60, one when the valve is used horizontally as shown, and the other when the valve is used vertically. When the valve is used in an upright position, the yoke is adjusted rotatably so that it shall stand in substantially the same relation to the boss $60^{a\prime}$ as it is shown with relation to boss $60^a$, it being also understood that the lever 50 is shifted on the shaft so as to accommodate and permit of the adjustment of the yoke mentioned and is so arranged that its weighted end will tend to close the valve. The plate 60 is also removed from boss $60^a$ and secured by screw 61 and its dowel pin 62 to boss $60^{a\prime}$ so that in such new position it may be connected by link 59 with hook 55 on the lever and thus prevent the latter from closing the valve until the link is kicked off or it has been fused under the influence of heat. In the event that it is desired to effect automatic closure of the valve when subjected to a predetermined heat, the link 59 will be made of fusible material, so that when the link melts, the weight will operate the lever 50 and close valve plug 7 upon its seat.

For operating the valve, that is for closing the valve, manually from a remote point exterior to the building by preference, the usual wire cable 64 is employed, the same extending through slot 53 of lever 50 and being attached at its lower end to the foot 57 of trigger 56. By this arrangement it will be seen that an upward pull on the cable will first operate the trigger to trip the link 59 from engagement with the lever 50 and plate 60, and immediately after this action occurs the foot 57 will strike and force upward the unweighted end of lever 50, the blow thus coöperating with weight 52 in seating the valve 7, in the event of any tendency on the part of the sectional shaft or the stems of valve 7, to stick.

It will be seen that the force which can be applied from the control box (not shown)

containing the upper end of the cable, acts only to seat the valve and that the latter cannot be reopened or reset without direct access to the valve mechanism, nor can the valve be held open without either restoring the kick-off link or replacing it by another one if the original had been destroyed by heat.

From the above description it will be apparent that I have produced an efficient gas shut-off valve embodying the features enumerated as advantageous, and which obviously may be modified in form, proportion, detail construction and organization without departing from the spirit and scope of the appended claims.

I claim:

1. In a valve, a casing having a communicating chambered portion provided with alined oppositely-projecting tubular hubs, one of said hubs having its bore enlarged to form a tapered seat or bearing facing the chambered portion, and the other hub having an internal bearing and screw threads, a shaft extending transversely through the chambered portion and journaled and endwise-movable in the last-named bearing and provided with a conical enlargement engaging the said tapered seat or bearing, a split nut engaging the threaded portion of said hub, an expanding plug engaging and expanding said split nut to secure the same against accidental movement, and a clamping screw adjustably mounted in the expanding plug and engaging the adjacent end of the shaft to hold the conical portion thereof firmly upon the tapered seat or bearing.

2. In a valve, a casing having a communicating chambered portion provided with alined oppositely-projecting tubular hubs, one of said hubs having its bore enlarged to form a seat or bearing facing the chambered portion and the other hub having an internal bearing and screw threads, a shaft extending transversely through the chambered portion and journaled and endwise-movable in the last-named bearing and provided with an enlargement engaging the said seat or bearing facing the chambered portion, an adjustable device secured within the threaded hub, a plug threaded into said adjustable device, a clamping screw extending through said plug and engaging the adjacent end of said shaft, a lock nut mounted upon said screw and bearing against said plug, and a hollow nut screwed into said hub and inclosing the outer end of said clamping screw.

3. In a gas shut-off valve, a casing having an offset chambered portion provided with alined oppositely-projecting hubs, one hub having a cylindrical internal seat and the other a tapering seat, a sectional shaft extending transversely through said chambered portion and composed of members interlocked together as regards rotative movement, one member of the shaft having an enlarged cylindrical portion engaging the said cylindrical seat and the other member an enlarged tapered portion engaging said tapered seat, a valve within the casing, a crank arm mounted upon the shaft to turn therewith and connected to seat and unseat said valve, means to rock said shaft, means within the hub containing the cylindrical seat, for applying unyielding endwise pressure on the adjacent end of one member of said shaft to hold the tapered portion of the other member pressed against the said tapered seat, and means closing the outer end of the hub containing the pressure-applying means.

4. In a gas shut-off valve, a casing having an offset chambered portion provided with alined oppositely-projecting hubs, one hub having an inwardly-facing seat or bearing, a sectional shaft extending transversely through said chambered portion and composed of members interlocked together as regards rotative movement, one member of the shaft having an enlarged portion engaging said inwardly facing seat or bearing, an expansible device adjustably secured in the hub at the opposite side of the chambered portion from the hub provided with the inwardly-facing seat or bearing, a tapered expanding plug engaging and clamping said expansible device at the desired point of adjustment thereof in said hub, an adjustable device secured to and extending through said plug and engaging the adjacent end of the sectional shaft and clamping the enlarged portion thereof against said inwardly-facing seat or bearing, means mounted on said adjustable device and engaging said plug to prevent accidental movement of said adjustable device, and means for sealing the outer end of the hub containing said expansible device.

5. In a gas cut off valve, a casing having an offset chambered portion provided with alined oppositely-projecting hubs, one hub having an inwardly-facing seat or bearing, a sectional shaft extending transversely through said chambered portion and composed of members interlocked together as regards rotative movement, one member of the shaft having an enlarged portion engaging said inwardly-facing seat or bearing, means within one of said hubs for applying unyielding endwise pressure on one member of the shaft to hold said enlarged portion of the other member pressed against said seat or bearing, a yoke rigid on the casing, provided with a socket axially alined with and outward of the hub having the inwardly-facing seat or bearing and forming a bearing for the outer end of the shaft member having the enlarged portion, a crank arm mounted on the shaft within said chambered portion and projecting into the casing, a valve within the casing to be seated and unseated by said crank arm, a lever extending through the yoke and mounted on the shaft section journaled in the yoke, means engaging the lever for holding the valve normally open, and means for tripping said holding means and then operating the lever to positively close the valve.

6. In a gas shut-off valve, a casing having an offset chambered portion provided with alined oppositely-projecting hubs, one hub having an inwardly-facing seat or bearing, a sectional shaft extending transversely through said chambered portion and composed of members interlocked together as regards rotative movement, one member of the shaft having an enlarged portion engaging said inwardly-facing seat or bearing, means within one of said hubs for applying unyielding endwise pressure on one member of the shaft to hold said enlarged portion of the other member pressed against said seat or bearing, a yoke rigid with the casing, provided with a socket axially alined with and outward of the hub having the inwardly-facing seat or bearing and forming a bearing for the outer end of the shaft member having the enlarged portion, a crank arm mounted on the shaft within said chambered portion and projecting into the casing, a valve within the casing to be seated and unseated by said crank arm, a lever extending through the yoke and mounted on the shaft section journaled in the yoke, means tending to seat the valve, means for holding the valve normally open, a trigger, and means for operating the trigger to cause it to trip the said valve-holding means and then strike and operate the lever if automatic action of the latter fails or occurs too slowly.

7. A gas shut off valve, comprising a casing having an offset chambered portion communicating with the chamber of the casing, and provided with alined oppositely-projecting tubular hubs, one hub having an inwardly-facing seat or bearing, a sectional shaft in said hubs and extending through said chambered portion, comprising two sections or members interlocked together as regards rotatable movement, means for applying endwise pressure on the shaft to hold one member thereof seated on said seat or bearing, a crank arm secured on the sectional shaft within said chambered portion and projecting into the casing, a valve within the latter and adapted to be seated or unseated by said crank arm, a yoke provided with a socket forming a bearing for the outer end of the seated shaft member, a lever mounted on said shaft member tending to rock the sectional shaft to seat the valve, means for holding the valve unseated, and manually-operative means for tripping the last-named means to permit the valve to be seated.

8. In a valve, a casing having a communicating chambered portion, a valve within the casing, a rock shaft extending through the chambered portion and journaled therein, a crank arm for the shaft, extending into the casing and connected to seat and unseat the valve therein, a rotatably adjustable yoke on the casing provided with a bearing for one end of said shaft, a lever extending through the yoke and secured to the shaft and tending to turn the latter and seat the valve, a trigger, a plate adjustable on the casing to accommodate the rotatable adjustment of the yoke and the position of the valve extending therethrough, a link connecting the lever and the said plate in the path of said trigger, and means to operate the trigger to trip the link and leave the lever free for operation.

In testimony whereof I affix my signature in presence of two witnesses.

JOSEPH W. DEARING.

Witnesses:
H. C. RODGERS,
G. Y. THORPE.